United States Patent
Cuzzato

(12) 
(10) Patent No.: US 6,436,362 B1
(45) Date of Patent: Aug. 20, 2002

(54) PROCESS FOR PREPARING ALUMINUM FLUORIDE

(75) Inventor: Paolo Cuzzato, Treviso (IT)

(73) Assignee: Ausimont S.p.A., Milan (IT)

( * ) Notice: Subject to any disclaimer, the term of this patent is extended or adjusted under 35 U.S.C. 154(b) by 0 days.

(21) Appl. No.: 09/305,675

(22) Filed: May 5, 1999

(30) Foreign Application Priority Data

May 7, 1998 (IT) .......................................... MI98A0995

(51) Int. Cl.$^7$ .............................. C01B 9/08; C01F 7/50; B01J 27/12
(52) U.S. Cl. ........................................ 423/489; 423/495
(58) Field of Search ................................ 423/489, 495; 502/231

(56) References Cited

U.S. PATENT DOCUMENTS

| | | | |
|---|---|---|---|
| 3,473,887 A | * 10/1969 | Chu et al. .................... | 423/489 |
| 3,855,401 A | * 12/1974 | Aiso et al. ................... | 423/489 |
| 4,205,017 A | * 5/1980 | Bjornson .................... | 585/469 |
| 4,402,924 A | 9/1983 | McVicker et al. | |
| 4,967,023 A | 10/1990 | Carmello et al. | |
| 5,008,475 A | * 4/1991 | Manzer et al. ............... | 570/168 |
| 5,905,174 A | * 5/1999 | Kanari et al. ................ | 568/411 |
| 5,981,813 A | * 11/1999 | Guzzato et al. ............. | 570/166 |

FOREIGN PATENT DOCUMENTS

| | | | | |
|---|---|---|---|---|
| EP | 0 1000485 | | 8/1965 | |
| EP | 0 879 790 A1 | | 11/1998 | |
| GB | 328688 | * | 5/1930 | |
| GB | 425693 | * | 3/1935 | ................. 423/489 |
| UA | 902798 | | 8/1962 | |
| WO | WO97/10053 | * | 3/1997 | |

OTHER PUBLICATIONS

Webster's New International Dictionary of the English Language, 2$^{nd}$ edition, Unabridged, Nelson et al, pp. 1085, 1957 (no month).*

Z. HAO et al., "Catalyst for the fluorination of halogenated hydrocarbon(s) — has an active aluminium fluoride support with high relative suface area and pore volume and has improved selectivity and reactivity at low temps", *WPI World Patent Information Derwent*, vol. 18, No. 97, 1900.

* cited by examiner

*Primary Examiner*—Ngoc-Yen Nguyen
(74) *Attorney, Agent, or Firm*—Arent Fox Kintner Plotkin & Kahn

(57) ABSTRACT

Process for preparing aluminum fluoride which comprises fluorination of alumina with gaseous HF, characterized in that the alumina is fluorinated with HF at an initial temperature lower than 300° C., the temperature is raised with a temperature gradient $\leq 100°$ C./hour up to the final temperature >320° C. and <450° C., fluorination is continued at the final temperature until feeding a HF molar amount at least equal to the stoichiometric with respect to the alumina, fluorination being carried out until a fluorinated alumina with a fluorine content not lower than 95% of the stoichiometric is obtained.

8 Claims, No Drawings

PROCESS FOR PREPARING ALUMINUM FLUORIDE

The present invention relates to a process for preparing aluminum fluoride and the so obtained aluminum fluoride.

Specifically the invention relates to an improved process for preparing aluminum fluoride starting from the corresponding oxide.

Aluminum fluoride ($AlF_3$) is an inorganic solid well known in the art of heterogeneous catalysts preparation. It is used both as such and as a support for metal salts having catalytic activity due to its strong acidity according to Lewis and/or its thermal and chemical inertia. It is widely used, for example, in the fluorination of chlorinated organic compounds to obtain the corresponding fluorinated compounds; in this case it is used also as a support of chromium, cobalt, nickel salts, etc. See for instance U.S. Pat. No. 4,967,023 and U.S. Pat. No. 5,008,475.

The preparation on an industrial scale of the aluminum fluoride is carried out by fluorination of the aluminum oxide (alumina) with anhydrous hydrofluoric acid (HF). Other methods are also known which however have substantially lab applications, such as the hexafluoroaluminates pyrolysis; the alumina treatment with organic chloro-fluorinated compounds; the F/X exchange on an aluminum halide, wherein X is equal to Cl, Br; etc.

The alumina fluorination with anhydrous HF to obtain $AlF_3$ is well known in the art and is described for example in FR 1,383,927, wherein the so obtained $AlF_3$ is then used as such to catalyze the HF sum on acetylene.

As is well known to those skilled in catalysts preparation, it is desirable that a solid which must be used as heterogeneous catalyst, both as such and as a support for a catalytically active phase, has a surface area (SA) as high as possible. Typical examples of solids used for this purpose are the various types of alumina with surface areas of 200–300 $m^2/g$.

However the alumina fluorination to obtain $AlF_3$ drastically reduces said value: the obtained $AlF_3$ indeed shows lower SA. In order to try to increase this value it is well known to limit fluorination below the stoichiometric.

This process of course cannot be applied to the fluorination catalysts, since the HF used as a reactant would lead to completion of alumina fluorination with consequent loss of surface area and catalytic activity.

In order to overcome this drawback it has been suggested, see GB 1,000,485, to regenerate alumina when it is excessively fluorinated, by treatment with steam at high temperatures. Said process is of course not very practical on an industrial scale, especially due to the great aggressiveness of the gaseous mixture of HF and water at high temperature which is thus produced. A further drawback is that these kinds of catalyst require frequent regeneration and therefore the interruption of the production processes where they are used.

It has now been surprisingly and unexpectedly found by the Applicant that it is possible to obtain $AlF_3$ having an high surface area by alumina fluorination with anhydrous HF by using the process described hereinafter wherein said fluorination is carried out under very specific conditions.

It is therefore an object of the present invention to prepare aluminum fluoride having a high surface area comprising fluorination of alumina with gaseous HF having surface area of at least 150 $m^2/g$, characterized in that the alumina is fluorinated with HF at an initial temperature lower than 300° C., preferably in the range 100°–280° C., still more preferably in the range 150°–200° C., the temperature is raised with a temperature gradient $\leq 100°$ C./hour up to the final temperature >320° C. and <450° C., preferably in the range 350°–400° C.; then the fluorination is continued at the final temperature until feeding a HF molar amount at least equal to the stoichiometric with respect to the alumina, preferably 1.3 times higher than the stoichiometric, the fluorination being continued until a fluorinated alumina having a fluorine content not lower than 95% of the stoichiometric is obtained.

Preferably the HF flow is diluted with air or inert gas, more preferably air, in volume ratios HF/diluent 0.1:1 to 1:1.

Preferably the thermal gradient is 10°–90° C./hour, more preferably 20°–50° C./hour.

The $AlF_3$ obtainable with the process of the invention has a surface area higher than that obtainable by direct fluorination of alumina at the final temperature.

According to another aspect of the invention, the alumina to be fluorinated is brought to the initial fluorination temperature and can be partially fluorinated at this temperature before starting the gradient up to the final temperature, it is then allowed to fluorinate at the final temperature until a fluorinated alumina with a fluorine content not lower than 95% of the stoichiometric is obtained.

The total pressure has no important effects and one generally operates at atmospheric or at slightly higher pressure, generally of some atmospheres.

It is instead advantageous that the HF partial pressure is low, especially at the beginning of the fluorination, to moderate the heat development which could locally increase the temperature beyond the limits before mentioned. Indeed two highly exothermic phenomena contemporaneously take place: the reaction between HF and alumina with formation of $AlF_3$ and water; and the hydration of the unreacted HF by water.

To moderate this exothermic process it is sufficient to use HF diluted with an inert gas in the fluorination conditions, for example, air or nitrogen, with the indicated HF/diluent ratio by volume.

A better control of the temperature is achieved also by carrying out the reaction in a fluidized bed and this is the preferred way to carry out the fluorination. In this case the aluminas to be fluorinated have a particle size distribution compatible with the use of fluidized beds.

When the aluminas are in hydrated form, it is preferable to precede the fluorination with a calcination phase in air or nitrogen, at temperatures between 300° C. and 400° C. This limits the water development during the reaction, which is undesirable especially as it favours the plants corrosion.

The preferred aluminas for the fluorination have pseudo-boehmite crystalline structure, surface area of about 300 $m^2/g$. Optionally they can contain silica up to 15% by weight, generally from 1 to 5%.

The aluminas and the aluminum fluorides are characterized by techniques well known to the skilled in the art of solid characterization: the surface area (SA) is measured by nitrogen adsorption according to the BET method. The analytical composition is detrminrd by wet way according to known methods.

The aluminum fluoride obtainable by the process of the invention can advantageously be used as a support for preparing catalysts for the fluorination of halogenated organic compounds, specifically to obtain R-32 $CH_2F_2$.

Some examples follow for illustrative purposes only, the variations which can be applied without deviating from the spirit of the invention are easily accessible to the skilled man.

EXAMPLES

In all the Examples a commercial alumina CONDEA precalcined in air flow at 360° C. for 10 hours is used. The fluorination method is the following: said alumina is loaded, the reactor is brought up to the desired temperature (initial temperature) in air flow, then the HF feeding is started. At this point the temperature gradient starts until the desired maximum temperature (final temperature) is reached. Then it is left at this temperature for the necessary time to feed an HF amount equal to about (1.3 moles of the stoichiometric (the reaction is: $Al_2O_3 + 6 HF \rightarrow 2 AlF_3 + 3 H_2O$).

Example 1 (comparative)

180 g of alumina CONDEA SIRAL® 1.5 are fed in an Inconel® 600 tubular reactor having a 50 mm diameter, electrically heated and equipped with porous septum at the base, heated up to 360° C. in air flow, and fluorinated for 16 hours with a mixture air/HF (0.85 moles/h of HF, 4 moles/h of air) at the constant temperature of 360° C. It is allowed to cool and about 240 g of aluminum fluoride having the following characteristics: AS=34.5 $m^2/g$, are discharged.

Example 2 (comparative)

The fluorination of Example 1 is repeated with the only difference that the working temperature is of 380° C. 242 g of aluminum fluoride having the following characteristics: AS=21.8 $m^2/g$, are obtained.

Example 3

180 g of alumina of Example 1 are fluorinated starting at the temperature of 200° C. which rises up to 360° C. with a 20° C./h gradient, with the same mixture air/HF described in Example 1. About 252 g of aluminuln fluoride having the following characteristics: AS=42.3 $m^2/g$, are obtained. It is well evident, in Example 3, the increase of SA in comparison with the comparative Examples, even though the starting alumina was always the same.

Example 4

180 g of alumina of Example 1 are fluorinated starting at the temperature of 150° C. and rising up to 360° C. with a 20° C./hour gradient, with the same air/HF mixture described in Example 1. About 245 g of $AlF_3$ with AS=55.4 $m^2/g$, are obtained. Example 5 (comparatie)

180 g of alumina CONDEA Pural® SCC-10 are introduced in the reactor of Example 1, heated to 360° C. in air flow and fluorinated with an air/HF mixture equal to that of Example 1, at the constant temperature of 360° C. It is allowed to cool in air flow and about 270 g of aluminum fluoride having SA=19.8 $m^2/g$ are discharged. Example 6

180 g of alumina CONDEA Pural® SCC-10 of Example 5 are introduced in the reactor of Example 5, heated to 200° C. in air flow and fluorinated with the same air/HF mixture of Example 5; during fluorination a 20° C./hour temperature gradient is used up to 360° C.; finally one remains at 360° C. for the necessary time to complete fluorination; about 270 g of $AlF_3$ having AS=35.3 $m^2/g$, are obtained.

What is claimed is:

1. A process for preparing aluminum fluoride which is a support for preparing catalysts for the fluorination of halogenated organic compounds, wherein said process consists essentially of fluorinating alumina having a surface area of at least 150 $mm^2/g$ with gaseous HF, at an initial temperature lower than 300° C.;

raising the temperature with a temperature gradient <100° C./hour up to a final temperature in the range 350° C.–400° C.;

continuing fluorination at the final temperature until feeding an HF molar amount at least equal and up to 1.3 times greater than the stoichiometric with respect to the alumina; and fluorinating until a fluorinated alumina with a fluorine content not less than 95% of the stoichiometric is obtained.

2. A process according to claim 1, wherein the alumina is fluorinated with HF at an initial temperature in the range 100°–280° C.

3. A process according to claim 2 wherein the alumina is fluorinated with HF at an initial temperture in the range 150°–200° C.

4. A process according to claim 1, wherein the HF flow is diluted with air or inert gas, in volume ratios HF/diluent 0.1:1 to 1:1.

5. A process according to claim 1 wherein the thermal gradient is 10°–90° C./hour.

6. A process according to claim 5 wherein the thermal gradient is 20°–50° C./hour.

7. A process according to claim 1, wherein the fluorination is carried out in fluidized bed.

8. A process according to claim 1, wherein the alumina for fluorination has pseudo-bohemite crystalline structure, surface area of about 300 $m^2/g$, optionally containing silica up to 15% by weight.

* * * * *